United States Patent
You et al.

(10) Patent No.: US 10,525,977 B2
(45) Date of Patent: Jan. 7, 2020

(54) SERVER AND METHOD FOR CONTROLLING REGENERATIVE BRAKING OF ECO-FRIENDLY VEHICLE

(71) Applicants: Hyundai Motor Company, Seoul (KR); Kia Motors Corporation, Seoul (KR)

(72) Inventors: Jin Young You, Seoul (KR); Sang Woo Park, Seoul (KR); Jung Seob Park, Gyeonggi-do (KR); Kang Ju Cha, Seoul (KR); Jang Yong Lee, Jeollabuk-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 210 days.

(21) Appl. No.: 15/698,003

(22) Filed: Sep. 7, 2017

(65) Prior Publication Data
US 2018/0273039 A1    Sep. 27, 2018

(30) Foreign Application Priority Data
Mar. 22, 2017    (KR) ........................ 10-2017-0035868

(51) Int. Cl.
| | |
|---|---|
| B60L 7/18 | (2006.01) |
| B60W 30/18 | (2012.01) |
| G06F 19/00 | (2018.01) |
| B60R 16/02 | (2006.01) |
| B60W 20/15 | (2016.01) |

(52) U.S. Cl.
CPC ......... *B60W 30/18127* (2013.01); *B60L 7/18* (2013.01); *B60W 20/15* (2016.01); *B60W 2540/10* (2013.01); *B60W 2540/12* (2013.01); *B60W 2550/20* (2013.01)

(58) Field of Classification Search
CPC ....... B60W 30/18; G01M 15/00; G06F 19/00; B60L 7/18; B60R 16/02
See application file for complete search history.

(56) References Cited

U.S. PATENT DOCUMENTS

| | | | | |
|---|---|---|---|---|
| 5,913,917 A | * | 6/1999 | Murphy | .............. B60R 16/0232 701/123 |
| 2010/0057280 A1 | * | 3/2010 | Crowe | ..................... B60K 6/48 701/22 |
| 2015/0151638 A1 | * | 6/2015 | Tagawa | ..................... B60L 7/14 701/22 |

FOREIGN PATENT DOCUMENTS

KR    10-2012-0051177 A    5/2012

* cited by examiner

*Primary Examiner* — Yuri Kan
(74) *Attorney, Agent, or Firm* — Mintz Levin Cohn Ferris Glovsky and Popeo, P.C.; Peter F. Corless

(57) ABSTRACT

A server and a method for automatically controlling regenerative braking of an eco-friendly vehicle are provided. A regenerative braking level is calculated by considering driving information and a driving environment of a vehicle using a regenerative braking controlling server. The calculated regenerative braking level is transmitted to a regenerative braking controlling apparatus mounted within the vehicle and thus, even though a vehicle driver does not directly set the regenerative braking level, the regenerative braking level transmitted from the regenerative braking controlling server is received through the regenerative braking controlling apparatus of the vehicle to perform regenerative braking, thereby enhancing driving convenience and stability, and fuel efficiency.

15 Claims, 2 Drawing Sheets

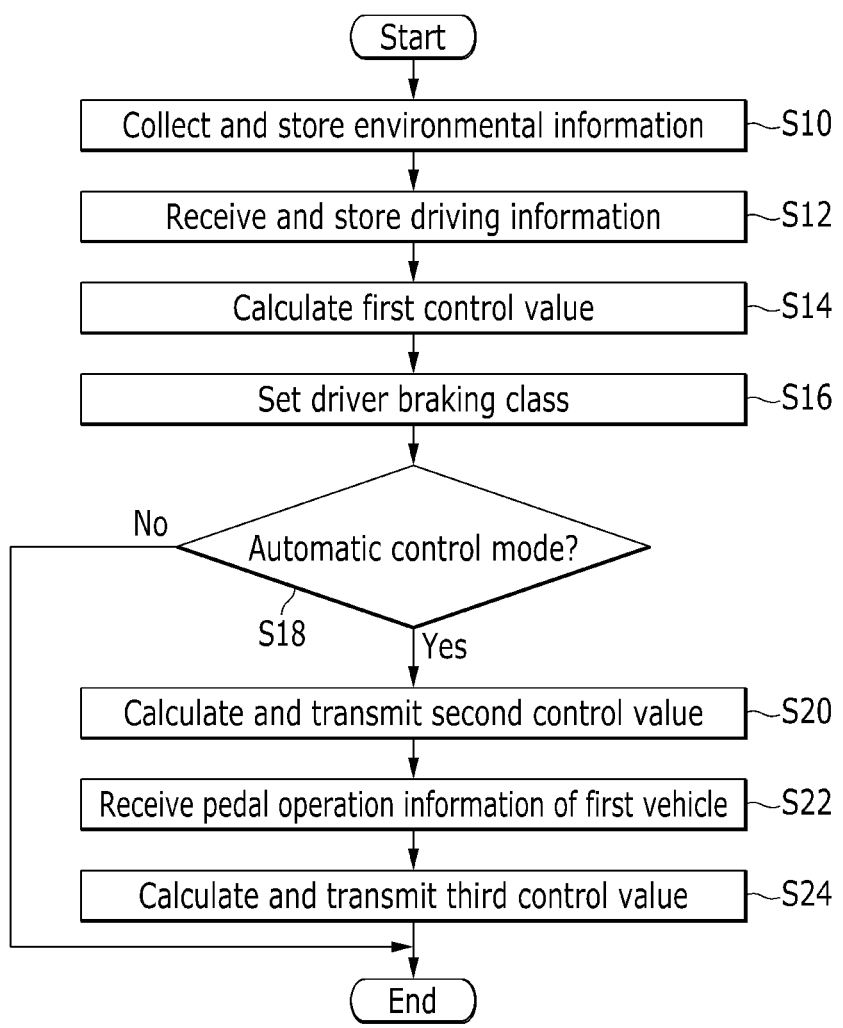

SERVER AND METHOD FOR CONTROLLING REGENERATIVE BRAKING OF ECO-FRIENDLY VEHICLE

CROSS-REFERENCE TO RELATED APPLICATION

This application claims priority to and the benefit of Korean Patent Application No. 10-2017-0035868 filed in the Korean Intellectual Property Office on Mar. 22, 2017, the entire contents of which are incorporated herein by reference.

BACKGROUND

(a) Field of the Invention

The present invention relates to a server and a method for automatically controlling regenerative braking of an eco-friendly vehicle and more particularly, to a method for automatically controlling regenerative braking of an eco-friendly vehicle by considering driving information and a driving environment of the vehicle.

(b) Description of the Related Art

A regenerative braking system converts kinetic energy generated during deceleration of an eco-friendly vehicle including a high voltage battery into electric energy to charge the high voltage battery. In particular, the high-voltage battery is charged using the regenerative braking system when a driver of the eco-friendly vehicle disengages an accelerator pedal or engages a brake pedal and thereafter, the charged energy is used while driving.

In the eco-friendly vehicle of the related art, the driver directly sets a regenerative braking level when disengaging the accelerator pedal. However, it may be difficult for the driver to set the regenerative braking level to an optimum state based on characteristics of a road which the vehicle passes through and a driving speed. For example, when regenerative braking force is excessively set, coasting is not capable of being utilized and a driving feeling deteriorates in that the vehicle decelerates more than an intention of the driver. In addition, when deceleration is caused by regenerative braking which is not desired by the driver, fuel efficiency may be reduced in that reacceleration is required. Further, when the regenerative braking level is set to be low, the driver is required to operate the brake pedal several times to decelerate the vehicle, thereby increasing driving fatigue.

The above information disclosed in this section is merely for enhancement of understanding of the background of the invention and therefore it may contain information that does not form the prior art that is already known in this country to a person of ordinary skill in the art.

SUMMARY

The present invention provides a server and a method for calculating a regenerative braking level for automatically controlling regenerative braking by considering driving information and a driving environment of a vehicle and transmitting the calculated regenerative braking level to a regenerative braking control device (e.g., controller) mounted within the vehicle. The exemplary embodiments of the present invention may be used for achieving other objects which are not mentioned in detail in addition to the objects.

An exemplary embodiment of the present invention provides a server for controlling regenerative braking, connected with multiple regenerative braking controlling apparatuses mounted within multiple vehicles including a first vehicle, respectively via a network that may include: a driving information receiving unit configured to receive driving information transmitted from the multiple regenerative braking controlling apparatuses (e.g., controllers); a first control value calculating unit configured to calculate a first control value that corresponds to a regenerative braking level providing maximum fuel efficiency for each predetermined road section based on the received driving information; and a second control value calculating unit configured to set a braking class of a driver of the first vehicle based on a brake pedal operation pattern in the driving information transmitted from the regenerative braking controlling apparatus mounted within the first vehicle, and calculate a second control value that corresponds to the calculated first control value and the set braking class and transmit the calculated second control value to the regenerative braking controlling apparatus mounted within the first vehicle.

The server may further include a third control value calculating unit configured to calculate a third control value that corresponds to the number of operation or engagement times of an accelerator pedal and the number of operation or engagement times of the brake pedal in the driving information transmitted form the regenerative braking controlling apparatus mounted within the first vehicle performing the regenerative braking based on the transmitted second control value and configured to transmit the calculated third control value to the regenerative braking controlling apparatus mounted within the first vehicle.

Further, the driving information may include a location, a speed, a fuel amount, the number of operation times of the accelerator pedal, the number of operation times of the brake pedal, a brake pedal operation continuation time, and the regenerative braking level of the vehicle. The server may further include an environmental information collecting unit configured to collect environmental information that corresponds to the predetermined road section, and the first control value calculating unit may be configured to calculate fuel efficiency for each vehicle that corresponds to the predetermined road section based on the collected environmental information and the received driving information and calculate the first control value by learning the regenerative braking level that corresponds to the calculated fuel efficiency for each vehicle.

The second control value calculating unit may be configured to calculate the second control value by applying a standard deviation that corresponds to an average speed for each road section to the first control value. The third control value calculating unit may be configured to calculate the third control value by applying a predetermined increase rate to the standard deviation to correspond to the number of operation times of the accelerator pedal or calculate the third control value by applying a predetermined decrease rate to the standard deviation to correspond to the number of operation times of the brake pedal. The brake pedal operation pattern may include the number of operation times and the continuation time of the brake pedal.

Another exemplary embodiment of the present invention provides a method for controlling regenerative braking using a regenerative braking controlling server, connected with multiple regenerative braking controlling apparatuses mounted within multiple vehicles including a first vehicle, respectively via a network, that may include: receiving, by a driving information receiving unit, driving information transmitted from the multiple regenerative braking controlling apparatuses; calculating, by a first control value calculating unit, a first control value that corresponds to a regenerative braking level providing maximum fuel efficiency for each predetermined road section based on the received driving information; setting, by a second control value calculating unit, a braking class of a driver of the first vehicle based on a brake pedal operation pattern in the driving information transmitted from the regenerative braking controlling apparatus mounted within the first vehicle; calculating, by the second control value calculating unit, a second control value that corresponds to the calculated first control value and the set braking class; and transmitting, the second control value calculated by the second control value calculating unit to the regenerative braking controlling apparatus mounted within the first vehicle.

The method may further include: receiving the number of operation or engagement times of an accelerator pedal and the number of operation or engagement times of the brake pedal, transmitted from the regenerative braking controlling apparatus mounted within the first vehicle performing the regenerative braking based on the second control value transmitted from the driving information receiving unit; calculating, by a third control value calculating unit, a third control value that corresponds to the number of operation times of the accelerator pedal or the number of operation times of the brake pedal, which is received; and transmitting the third control value calculated by the third control value calculating unit to the regenerative braking controlling apparatus positioned in the first vehicle.

The method may further include: collecting, by an environmental information collecting unit, environmental information that corresponds to the predetermined road section; and calculating, by the first control value calculating unit, fuel efficiency for each vehicle that corresponds to the predetermined road section based on the collected environmental information and the received driving information and calculating the first control value by learning the regenerative braking level that corresponds to the calculated fuel efficiency for each vehicle.

The method may further include: calculating, by the second control value calculating unit, the second control value by applying a standard deviation that corresponds to an average speed for each road section to the first control value; and calculating, by the third control value calculating unit, the third control value by applying a predetermined increase rate to the standard deviation to correspond to the number of operation times of the accelerator pedal or calculating the third control value by applying a predetermined decrease rate to the standard deviation to correspond to the number of operation times of the brake pedal. The brake pedal operation pattern may include the number of operation times and the continuation time of the brake pedal.

According to exemplary embodiments of the present invention, fuel efficiency and a driving feeling of an eco-friendly vehicle may be enhanced and driving convenience of a driver may be enhanced.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 illustrates a method for providing a regenerative braking level using the server for controlling regenerative braking of FIG. 1 according to an exemplary embodiment of the present invention.

DETAILED DESCRIPTION

Figure 1:
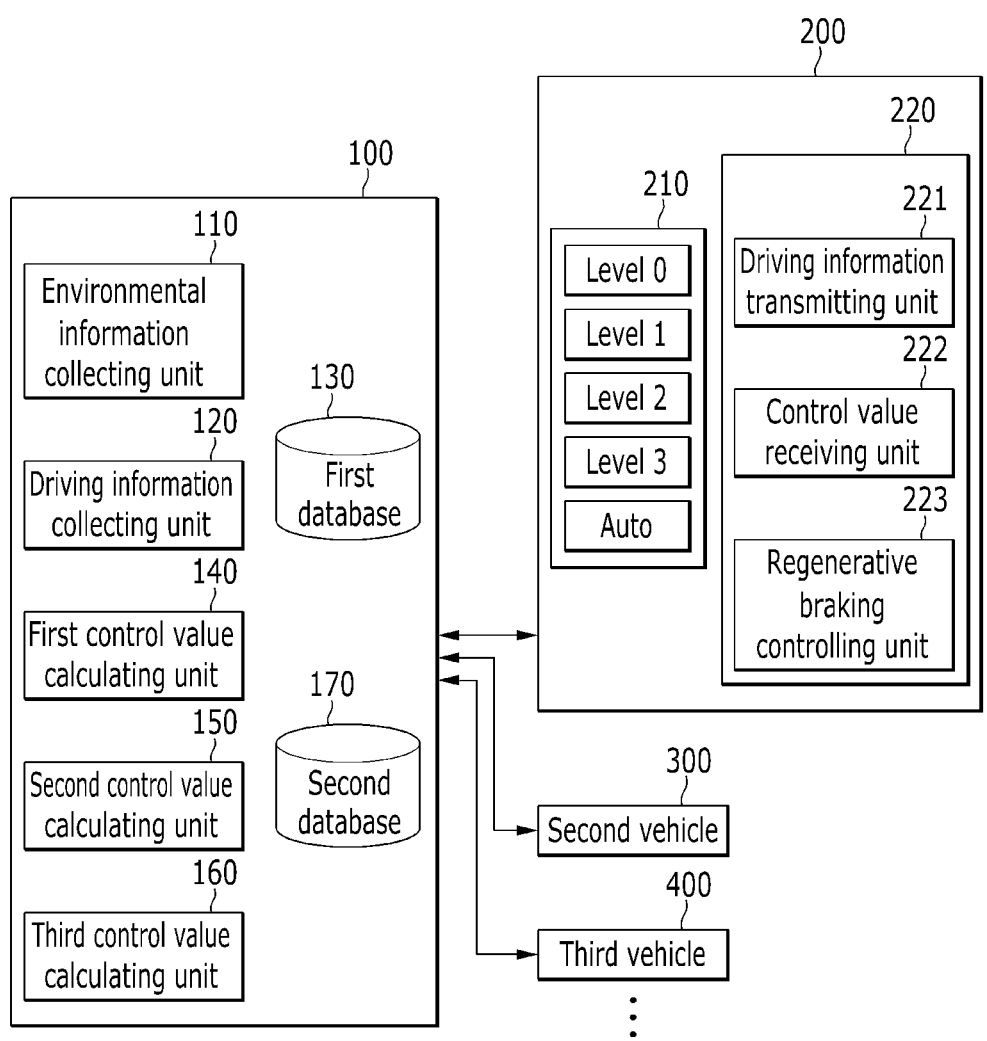
FIG. 1 illustrates a configuration of a server for controlling regenerative braking according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail to be easily carried out by those skilled in the art, with reference to the accompanying drawings. The present invention may be realized in various different forms, and is not limited to the exemplary embodiments described herein. In the drawings, parts not associated with description are omitted for clearly describing the exemplary embodiment of the present invention and like reference numerals designate like elements throughout the specification. Further, a detailed description of known art which is widely known will be omitted.

In the present specification, unless explicitly described to the contrary, terms including "part", "module", "er", and the like disclosed in the specification mean a unit that processes at least one function or operation and this may be implemented by hardware or software or a combination of hardware and software.

In the present specification, an "eco-friendly vehicle" means a vehicle driven by using a battery engine and includes a hybrid vehicle selectively using an internal combustion engine and the battery engine and an electric vehicle using only the battery engine. A "regenerative braking level" means a strength with which an engine brake is put on when an accelerator pedal is completely released (OFF). In particular, when the regenerative braking level is set to be high, a driver strongly feels braking force of the vehicle but charging efficiency of a high-voltage battery is enhanced when disengaging the accelerator pedal. On the contrary, when the regenerative braking level is set to be low, the driver weakly feels braking force of the vehicle but the charging efficiency of the high-voltage battery is decreased by coasting when disengaging the accelerator pedal. In the present specification, a "road section" means a unit to partition a road according to a predetermined reference. For example, the road section may be set by partitioning a road based on a distance, a type of the road, or a landmark.

FIG. 1 illustrates a configuration of a server for controlling regenerative braking according to an exemplary embodiment of the present invention. A server 100 for controlling regenerative braking of FIG. 1 may be configured to calculate and provide an optimum regenerative braking level that corresponds to a driving pattern of a vehicle driver and may be configured to transmit and receive data via a regenerative braking controlling apparatus and a wireless communication network positioned in each of multiple vehicles 200, 300, 400, . . . in real time.

The regenerative braking controlling server 100 of FIG. 1 may include an environmental information collecting unit 110, a driving information receiving unit 120, a first database 130, a first control value calculating unit 140, a second control value calculating unit 150, a third control value calculating unit 160, and a second database 170. The environmental information collecting unit 110 may be configured to collect environmental information that corresponds to a predetermined road section. In particular, the environmental information may include information related with a road gradient, a traffic amount, a congestion time, weather, and the like.

Further, the driving information receiving unit 120 may be configured to receive driving information transmitted from the regenerative braking control apparatus positioned in each of the multiple vehicles 200, 300, 400, . . . and store the received driving information in the first database 130. The driving information may include identification information, a location, a speed, a fuel amount, the number of operation times and a continuation time (e.g., an engagement time) of an accelerator pedal/brake pedal and regenerative braking control information of a vehicle. In particular, the regenerative braking control information may include regenerative braking levels set by a driver in a control mode (manual or automatic) and a manual mode.

The first control value calculating unit 140 may be configured to learn the environmental information that corresponds to the predetermined road section and the driving information transmitted from a plurality of regenerative braking controlling apparatuses to calculate the regenerative braking level (hereinafter, referred to as a 'first control value') at which fuel efficiency is maximum in the predetermined road section. Further, the first control value calculating unit 140 may be configured to transmit a first control value that corresponds to a relevant road section to the regenerative braking controlling apparatus of the vehicle in which the regenerative braking is set in the automatic mode among the vehicles positioned in the respective road sections.

In particular, an average speed, a fuel consumption amount, and the fuel efficiency for each vehicle that corresponds to the predetermined road section may be calculated by a controller using the location, the speed, and the fuel amount in the driving information. Further, the first control value in which the fuel efficiency for each road section is at the maximum may be calculated by considering the environmental information and the calculated fuel consumption amount. For example, the environmental information may be the traffic amount or the weather when the driving information is received.

Further, the first control value calculating unit 140 may be configured to learn a braking pattern of the driver and set a braking class of the driver based on a brake pedal operation pattern (e.g., the number of operation times and the continuation time) in the driving information of the vehicle. For example, the braking class of the driver may be set using logistic regression of Equation 1 given below in a statistical method.

$$J(\theta) = -\frac{1}{m}\left[\sum_{i=1}^{m} y^{(i)}\log h_\theta(x^{(i)}) + (1 - y^{(i)})\log(1 - h_\theta(x^{(i)}))\right] \quad \text{Equation 1}$$

When the number of operation times of the brake pedal is denoted by s and an average continuation time is denoted by t, the braking class of the driver may be classified as below. In particular, the number of operation or engagement times is based on a predetermined time or movement distance.

Class A: s>the reference number of times & t<reference time
=>an operation frequency of the brake pedal is high and the operation continuation time is short Class B: s>the reference number of times & t>reference time
=>the operation frequency of the brake pedal is high and the operation continuation time is long Class C: s<the reference number of times
=>the operation frequency of the brake pedal is low The second control value calculating unit 150 may be configured to calculate a second control value by reflecting a standard deviation that corresponds to the braking class of the driver to the first control value and transmit the calculated second control value to the regenerative braking controlling apparatus of the corresponding vehicle. The standard deviation s represents a correction value reference value that indicates whether the speed of the corresponding driver's vehicle is high or low based on the average speed of the corresponding road section.

For example, when the first control value that corresponds to a first road section is about 50 kph, a first vehicle 200 is positioned in the first road section, and the braking class of the driver of the first vehicle is C, about 60 kph acquired by reflecting the standard deviation about 10 kph to 50 kph may be transmitted to a regenerative braking controlling apparatus 220 of the first vehicle.

The third control value calculating unit 160 may be configured to generate a third control value by correcting the second control value based on the number of operation times of the accelerator pedal/brake pedal of the vehicle driver which performs the regenerative braking based on the second control value and may be configured to transmit the third control value to the regenerative braking controlling apparatus of the corresponding vehicle.

For example, when the number of operation times of the accelerator pedal of the first vehicle driver is equal to or greater than a predetermined number of times while the first vehicle 200 performs the regenerative braking based on the second control value, the third control value may be generated by reflecting a predetermined increase rate to the standard deviation reflected to the second control value and the generated third control value may be transmitted to the regenerative braking controlling apparatus 220 of the first vehicle. When the number of operation times of the brake pedal of the first vehicle driver is equal to or greater than a predetermined number of times, the third control value may be generated by reflecting a predetermined decrease rate to the standard deviation reflected to the second control value and the generated third control value may be transmitted to the regenerative braking controlling apparatus 220 of the first vehicle. The second database 170 may be configured to store the first, second, and third control values.

The multiple vehicles 200, 300, 400, . . . of FIG. 1 are implemented by connected vehicles and the multiple vehicles 200, 300, 400, . . . include the same components. Hereinafter, the components of the first vehicle 200 will be described in detail. The first vehicle 200 may include a regenerative braking level switch 210 and the regenerative braking controlling apparatus 220 which may be operated by a controller having a processor and a memory.

The regenerative braking level switch 210 may include a plurality of manual buttons Level 0, Level 1, Level 2, and Level 3 that corresponds to the manual mode using the regenerative braking level operated by the driver and one automatic button Auto that corresponds to the automatic mode using the control value transmitted from the regenerative braking controlling server 100.

For example, Level 0 refers to a step in which the vehicle is driven by coasting force of a tire when a foot is released from the accelerator pedal (e.g., the pedal is disengaged), Level 1 refers to a step in which the braking force is at an engine brake level of an internal combustion engine vehicle, Level 2 refers to a step in which the braking force is greater than an engine brake, and Level 3 (braking is performed while being decelerated for battery charging when the foot is released from the accelerator pedal) refers to a step in which the vehicle is enabled to be driven without engaging the brake pedal. The regenerative braking controlling apparatus 220 may be configured to perform the regenerative braking based on one of the first, second, and third control values transmitted from the regenerative braking controlling server 100. Additionally, the regenerative braking controlling apparatus 220 may include a driving information transmitting unit 221, a control value receiving unit 222, and a regenerative braking controller 223.

The driving information transmitting unit 221 may be configured to transmit the identification information, the location, the speed, the fuel amount, the number of operation times and the continuation time of the accelerator pedal/brake pedal and the regenerative braking control information of the first vehicle which is being driven to the regenerative braking controlling server 100 at a predetermined time interval. The control value receiving unit 222 may then be configured to receive the first, second, or third control value transmitted from the regenerative braking controlling server 100.

The regenerative braking controller 223 may be configured to perform the regenerative braking based on the received control value. In particular, a high-voltage battery may be charged by operating a motor of the vehicle based on the first, second, or third control value that correspond to the road section including a current location of the first vehicle and transmitted from the regenerative braking controlling server 100. The regenerative braking controller 223 according to the exemplary embodiment of the present invention may be configured to grant priorities in the order of the third, second, and first control values to perform the regenerative braking.

FIG. 2 illustrates a method for providing a regenerative braking level using the server for controlling regenerative braking of FIG. 1. In FIG. 2, a method for providing a regenerative braking control value to the regenerative braking controlling apparatus of the first vehicle positioned in a first road section will be described as an example. The method to be described herein below may be executed by a controller of the regenerative braking controlling apparatus.

First, the road gradient, traffic amount, congestion time, and weather information that correspond to the predetermined road section may be collected by the environmental information collecting unit 110 and stored in the first database 130 (S10). Thereafter, the driving information transmitted from the regenerative braking control apparatus positioned in each of the multiple vehicles may be received via the driving information receiving unit 120 and stored in the first database 130 (S12).

Thereafter, the first control value that corresponds to the predetermined road section may be calculated using the first control value calculating unit 140 (S14). In step S14, the environmental information for each road, collected in step S10 and the driving information received in step S12 may be learned to calculate the first control value. Further, the braking class of each vehicle driver may be set by the first control value calculating unit 140 (S16). In step S16, the braking pattern for each driver may be learned and the braking class for each driver may be set using the number of operation times and the continuation time of the brake pedal in the driving information received in step S12 and stored in the first database 130.

Thereafter, when the regenerative braking of the first vehicle is set in the automatic control mode (S18), the first control value that corresponds to the road section in which the first vehicle is positioned may be searched using the second control value calculating unit 150 and the second control value acquired by reflecting the standard deviation that corresponds to the braking class of the first vehicle driver to the searched first control value may be calculated and transmitted to the regenerative braking controlling apparatus 220 of the first vehicle (S20).

Thereafter, the number of operation or engagement times of the accelerator pedal and the number of operation times of the brake pedal of the first vehicle, which are transmitted from the regenerative braking controlling apparatus 220 of the first vehicle may be received via the driving information receiving unit 120 (S22). In particular, the first vehicle performs the regenerative braking based on the second control value transmitted in step S20.

Furthermore, the third control value calculating unit 160 may be configured to calculate the third control value based on the number of operation times of the accelerator pedal and the number of operation times of the brake pedal, received in step S22 and transmit the calculated third control value to the regenerative braking controlling apparatus 220 of the first vehicle (S24). In step S24, the standard deviation included in the second control value calculated in step S20 may be corrected to calculate the third control value.

According to the exemplary embodiments of the present invention, a regenerative braking use degree when disengaging the accelerator pedal may be optimized by learning the driving environment and the driving information of the vehicle to enhance the driving feeling and the fuel efficiency. In particular, the deceleration intention of the driver may be determined based on the number of operation times and the continuation time of the accelerator pedal/brake pedal of the driver and the coasting may be utilized by setting the regenerative braking level to be low, thereby reducing fuel loss due to reacceleration. Further, when frequent deceleration of the vehicle is anticipated due to the road characteristics, the traffic amount, and the weather, the regenerative braking level may be set to be high to minimize the brake pedal operation of the driver and reduce driving fatigue. According to the exemplary embodiments of the present invention, even though the driver does not directly set the regenerative braking level, the regenerative braking may be performed based on the control value transmitted from the regenerative braking controlling server to enhance driving convenience and stability.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

DESCRIPTION OF SYMBOLS

100: Regenerative braking controlling server
110: Environmental information collecting unit
120: Driving information receiving unit
130: First database
140: First control value calculating unit
150: Second control value calculating unit
160: Third control value calculating unit
170: Second database
200, 300, 400: Vehicle
210: Regenerative braking level switch
220: Regenerative braking controlling apparatus
221: Driving information transmitting unit
222: Control value receiving unit
223: Regenerative braking controller

What is claimed is:

1. A server for controlling regenerative braking, which is connected with multiple regenerative braking controlling apparatuses within a plurality of vehicles including a first vehicle, respectively via a network, the server comprising:
a driving information receiving unit configured to receive driving information transmitted from the multiple regenerative braking controlling apparatuses;
a first control value calculating unit configured to calculate a first control value that corresponds to a regenerative braking level providing maximum fuel efficiency for each predetermined road section based on the received driving information; and
a second control value calculating unit configured to set a braking class of a driver of the first vehicle based on a brake pedal operation pattern in the driving information transmitted from a regenerative braking controlling apparatus of the first vehicle, and calculate a second control value that corresponds to the calculated first control value and the set braking class and transmit the calculated second control value to the regenerative braking controlling apparatus.

2. The server of claim 1, further comprising:
a third control value calculating unit configured to calculate a third control value that corresponds to a number of operation times of an accelerator pedal and a number of operation times of the brake pedal in the driving information transmitted form the regenerative braking controlling apparatus performing the regenerative braking based on the transmitted second control value and configured to transmit the calculated third control value to the regenerative braking controlling apparatus.

3. The server of claim 1, wherein the driving information includes a location, a speed, a fuel amount, a number of operation times of the accelerator pedal, a number of operation times of the brake pedal, a brake pedal operation continuation time, and the regenerative braking level of the vehicle.

4. The server of claim 2, wherein the driving information includes a location, a speed, a fuel amount, the number of operation times of the accelerator pedal, the number of operation times of the brake pedal, a brake pedal operation continuation time, and the regenerative braking level of the vehicle.

5. The server of claim 1, further comprising:
an environmental information collecting unit collecting environmental information corresponding to each predetermined road section,
wherein the first control value calculating unit calculates fuel efficiency for each vehicle corresponding to each predetermined road section based on the collected environmental information and the received driving information and calculates the first control value by learning the regenerative braking level corresponding to the calculated fuel efficiency for each vehicle.

6. The server of claim 2, further comprising:
an environmental information collecting unit collecting environmental information corresponding to each predetermined road section,
wherein the first control value calculating unit calculates fuel efficiency for each vehicle corresponding to each predetermined road section based on the collected environmental information and the received driving information and calculates the first control value by learning the regenerative braking level corresponding to the calculated fuel efficiency for each vehicle.

7. The server of claim 2, wherein the second control value calculating unit is configured to calculate the second control value by applying a standard deviation that corresponds to an average speed for each road section to the first control value.

8. The server of claim 7, wherein the third control value calculating unit is configured to calculate the third control value by applying a predetermined increase rate to the standard deviation to correspond to the number of operation times of the accelerator pedal and calculate the third control value by applying a predetermined decrease rate to the standard deviation to correspond to the number of operation times of the brake pedal.

9. The server of claim 1, wherein the brake pedal operation pattern includes the operation continuation time of the brake pedal.

10. A method for controlling regenerative braking using a regenerative braking controlling server, which is connected with multiple regenerative braking controlling apparatuses mounted in a plurality of vehicles including a first vehicle, respectively via a network, the method comprising:
receiving, by a controller, driving information transmitted from the multiple regenerative braking controlling apparatuses;
calculating, by the controller, a first control value that corresponds to a regenerative braking level providing maximum fuel efficiency for each predetermined road section based on the received driving information;
setting, by the controller, a braking class of a driver of the first vehicle based on a brake pedal operation pattern in the driving information;
calculating, by the controller, a second control value that corresponds to the calculated first control value and the set braking class; and
transmitting, by the controller, the calculated second control value to a regenerative braking controlling apparatus positioned in the first vehicle.

11. The method of claim 10, further comprising:
receiving, by the controller, a number of operation times of an accelerator pedal and a number of operation times of the brake pedal;
calculating, by the controller, a third control value that corresponds to the number of operation times of the accelerator pedal or the number of operation times of the brake pedal; and
transmitting, by the controller, the calculated third control value to the regenerative braking controlling apparatus positioned in the first vehicle.

12. The method of claim 10, further comprising:
collecting, by the controller, environmental information that corresponds to each predetermined road section; and
calculating, by the controller, fuel efficiency for each vehicle that corresponds to each predetermined road section based on the collected environmental information and the received driving information and calculating the first control value by learning the regenerative braking level that corresponds to the calculated fuel efficiency for each vehicle.

13. The method of claim 11, further comprising:
collecting, by the controller, environmental information that corresponds to each predetermined road section; and
calculating, by the controller, fuel efficiency for each vehicle that corresponds to each predetermined road section based on the collected environmental information and the received driving information and calculating the first control value by learning the regenerative braking level that corresponds to the calculated fuel efficiency for each vehicle.

14. The method of claim 11, further comprising:
calculating, by the controller, the second control value by applying a standard deviation that corresponds to an average speed for each road section to the first control value; and
calculating, by the controller, the third control value by applying a predetermined increase rate to the standard deviation to correspond to the number of operation times of the accelerator pedal or calculating the third control value by applying a predetermined decrease rate to the standard deviation to correspond to the number of operation times of the brake pedal.

15. The method of claim 10, wherein the brake pedal operation pattern includes the operation continuation time of the brake pedal.

* * * * *